United States Patent
Baker et al.

(10) Patent No.: US 12,315,255 B2
(45) Date of Patent: *May 27, 2025

(54) USING MACHINE LEARNING TO TRAIN AND USE A MODEL TO PERFORM AUTOMATIC INTERFACE ACTIONS BASED ON VIDEO AND INPUT DATASETS

(71) Applicant: OpenAI Opco, LLC, San Francisco, CA (US)

(72) Inventors: Bowen Baker, Nevada City, CA (US); Ilge Akkaya, Palo Alto, CA (US); Peter Zhokhov, South San Francisco, CA (US); Joost Huizinga, San Francisco, CA (US); Jie Tang, San Francisco, CA (US); Adrien Ecoffet, Burlingame, CA (US); Brandon Houghton, San Francisco, CA (US); Raul Sampedro Gonzalez, San Mateo, CA (US); Jeffrey Clune, Vancouver (CA)

(73) Assignee: OpenAI OpCo LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,722

(22) Filed: Dec. 19, 2023

(65) Prior Publication Data
US 2024/0355120 A1    Oct. 24, 2024

Related U.S. Application Data

(63) Continuation of application No. 18/303,552, filed on Apr. 19, 2023, now Pat. No. 11,887,367.

(51) Int. Cl.
*G06V 20/40* (2022.01)
*G06V 10/774* (2022.01)

(52) U.S. Cl.
CPC ............ *G06V 20/41* (2022.01); *G06V 10/774* (2022.01)

(58) Field of Classification Search
CPC ............................ G06V 20/41; G06V 10/774
See application file for complete search history.

(56) References Cited

U.S. PATENT DOCUMENTS 10,824,239 B1 * 11/2020 Gupta ..................... G06F 3/017
10,839,215 B2    11/2020 Somers et al.
(Continued)

FOREIGN PATENT DOCUMENTS

| CN | 109091869 B | 7/2022 |
| KR | 20210027006 A | 3/2021 |
| WO | 2022234678 A1 | 11/2022 |

OTHER PUBLICATIONS

Lima, J. A. dos S. (Aug. 3, 2021). Adaptivity in single player video games. Repositório Aberto da Universidade do Porto: Home. Retrieved Apr. 14, 2023, from https://repositorio-aberto.up.pt/handle/10216/135599.

(Continued)

*Primary Examiner* — Md K Talukder
(74) *Attorney, Agent, or Firm* — Finnegan, Henderson, Farabow, Garrett & Dunner, LLP

(57) ABSTRACT

Disclosed herein are methods, systems, and computer-readable media for training a machine learning model to label unlabeled data and/or perform automated actions. In an embodiment, a method comprises receiving unlabeled digital video data, generating pseudo-labels for the unlabeled digital video data, the generating comprising receiving labeled digital video data, training an inverse dynamics model (IDM) using the labeled digital video data, and generating at least one pseudo-label for the unlabeled digital video data, wherein the at least one pseudo-label is based on a prediction, generated by the IDM, of one or more actions (Continued)

that mimic at least one timestep of the unlabeled digital video data. In some embodiments, the method further comprises adding the at least one pseudo-label to the unlabeled digital video data and further training the IDM or a machine learning model using the pseudo-labeled digital video data.

22 Claims, 5 Drawing Sheets

(56) References Cited

U.S. PATENT DOCUMENTS

| | | |
|---|---|---|
| 10,940,393 B2 | 1/2021 | Somers et al. |
| 11,100,373 B1* | 8/2021 | Crosby ................. G16H 30/40 |
| 11,887,367 B1* | 1/2024 | Baker ............... G06V 10/7747 |
| 2021/0255363 A1* | 8/2021 | Liu ......................... G01W 1/00 |
| 2022/0147761 A1* | 5/2022 | Tsai ...................... G06N 3/045 |
| 2022/0156514 A1* | 5/2022 | Gavrilyuk ............ G06V 10/763 |
| 2022/0156525 A1* | 5/2022 | Guizilini ............... G06N 3/084 |
| 2022/0156591 A1* | 5/2022 | Li .......................... G06V 10/82 |
| 2022/0301287 A1* | 9/2022 | Annangi .............. G06V 10/764 |
| 2022/0383638 A1* | 12/2022 | Tran ...................... G06V 20/49 |
| 2023/0053618 A1* | 2/2023 | Luc ....................... G06V 10/82 |
| 2023/0116417 A1* | 4/2023 | Taccari ............... G06V 10/774 |
| | | 706/15 |
| 2023/0138254 A1* | 5/2023 | Panda .................. G06N 3/0895 |
| | | 382/159 |

OTHER PUBLICATIONS

Aristidou, A., Lasenby, J., Chrysanthou, Y., & Shamir, A. (Sep. 2018). Inverse kinematics techniques in computer graphics: A survey. In *Computer graphics forum* (vol. 37, No. 6, pp. 35-58).

\* cited by examiner

USING MACHINE LEARNING TO TRAIN AND USE A MODEL TO PERFORM AUTOMATIC INTERFACE ACTIONS BASED ON VIDEO AND INPUT DATASETS

CROSS-REFERENCE TO RELATED APPLICATIONS

This application is a continuation of U.S. patent application Ser. No. 18/303,552, filed Apr. 19, 2023. The contents of the foregoing application are incorporated herein by reference in their entirety.

FIELD OF DISCLOSURE

The disclosed embodiments generally relate to systems, devices, methods, and computer readable media for training and using machine learning models to label online data and to perform automated actions via a human user interface.

BACKGROUND

Extant systems and methods used for training machine learning models to perform actions in sequential decision domains, such as robotics, video games, and computer usage, lack sufficient capabilities in utilizing publicly available data as training data. One of the reasons that such capabilities are lacking is that publicly available data used as the training data exists in the form of unlabeled data and/or noisy datasets. As a result of the unlabeled and/or noisy datasets, and a corresponding lack of available large, labeled datasets, training machine learning models to perform actions in sequential decision domains, and particularly via a human user interface, is currently inefficient, expensive, and complicated.

The inventors here have recognized several technical problems with such conventional systems, as explained below. For example, automating many virtual tasks, such as navigating websites, using computer applications or programs, booking flights, and so on, is difficult to learn using extant machine learning methods due to a lack of large, commonly available sources of labeled data. Additionally, extant machine learning methods and systems aim to learn without explicit action labels and generally rely on an ability to explore an environment throughout the training process, making such methods and systems susceptible to exploration bottlenecks. The present disclosure addresses these technical problems and provides solutions which utilize the breadth of publicly available unlabeled datasets both with more efficiency and at a lower cost.

SUMMARY

Embodiments of the present disclosure present technological improvements as solutions to one or more of the above-mentioned technical problems recognized by the inventors in conventional systems. For example, in an embodiment, a method for training a machine learning model to perform automated actions may include receiving unlabeled digital video data. In some embodiments, the method may further include generating pseudo-labels for the unlabeled digital video data. In some embodiments, the generating may include receiving labeled digital video data, training an inverse dynamics model (IDM) using the labeled digital video data, and/or generating at least one pseudo-label for the unlabeled digital video data, wherein the at least one pseudo-label is based on a prediction, generated by the IDM, of one or more actions that mimic at least one timestep of the unlabeled digital video data. In some embodiments, the method may further include adding the at least one pseudo-label to the unlabeled digital video data. In some embodiments, the method may also include further training the IDM or a machine learning model using the pseudo-labeled digital video data.

According to some disclosed embodiments, the IDM or machine learning model may be trained to generate one or more predicted actions to be performed via a user interface without human intervention. In some embodiments, a method may further comprise training the IDM or machine learning model to perform actions via the user interface based on the generated one or more predicted actions. In some embodiments, the one or more predicted actions generated may include at least one of a key press, a button press, a touchscreen input, a joystick movement, a mouse click, a scroll wheel movement, or a mouse movement.

In some embodiments, the received unlabeled digital video data may be public data. In some embodiments, the received labeled digital video data may include video data correlated with actual user action data. In some embodiments, the pseudo-labeled digital video data may include video data correlated with predicted user action data.

In some embodiments, a prediction may be based on past and future information within the unlabeled digital video data, the past and future information being relative to one or more reference frames within the unlabeled digital video data.

In some embodiments, a method may further comprise using the trained IDM to label additional unlabeled digital video data.

In some embodiments, further training using the pseudo-labeled digital video data may include training a causal machine learning model. In some embodiments, the causal machine learning model may be at least one of a behavioral cloning model or a reinforcement learning model.

According to other disclosed embodiments, a system may comprise at least one memory storing instructions and/or at least one processor configured to execute the instructions to perform operations for training a machine learning model to perform automated actions. In some embodiments, the operations may comprise receiving unlabeled digital video data. In some embodiments, the operations may further comprise generating pseudo-labels for the unlabeled digital video data. In some embodiments, the generating may comprise receiving labeled digital video data, training an inverse dynamics model (IDM) using the labeled digital video data, and/or generating at least one pseudo-label for the unlabeled digital video data, wherein the at least one pseudo-label may be based on a prediction, generated by the IDM, of one or more actions that mimic at least one timestep of the unlabeled digital video data. In some embodiments, the operations may further comprise adding the at least one pseudo-label to the unlabeled digital video data. In some embodiments, the operations may also comprise further training the IDM or a machine learning model using the pseudo-labeled digital video data.

In some embodiments, the IDM or machine learning model may be trained to generate one or more predicted actions to be performed via a user interface without human intervention. In some embodiments, the operations may further comprise training the IDM or machine learning model to perform actions via the user interface based on the generated one or more predicted actions. In some embodiments, the one or more predicted actions generated may include at least one of a key press, a button press, a touchscreen input, a joystick movement, a mouse click, a scroll wheel movement, or a mouse movement.

In some embodiments, the received labeled digital video data may include video data correlated with actual user action data. In some embodiments, the pseudo-labeled digital video data may include video data correlated with predicted user action data.

In some embodiments, a prediction may be based on past and future information within the unlabeled digital video data, the past and future information being relative to one or more reference frames within the unlabeled digital video data.

In some embodiments, the operations may further comprise using the trained IDM to label additional unlabeled digital video data.

In some embodiments, the operation of further training using the pseudo-labeled digital video data may include training a causal machine learning model. In some embodiments, the causal machine learning model may be at least one of a behavioral cloning model or a reinforcement learning model.

According to yet other disclosed embodiments, a non-transitory computer-readable medium may include instructions that are executable by one or more processors to perform operations. In some embodiments, the operations may comprise receiving unlabeled digital video data. In some embodiments, the operations may further comprise generating pseudo-labels for the unlabeled digital video data. In some embodiments, the generating may comprise receiving labeled digital video data, training an inverse dynamics model (IDM) using the labeled digital video data, and/or generating at least one pseudo-label for the unlabeled digital video data, wherein the at least one pseudo-label may be based on a prediction, generated by the IDM, of one or more actions that mimic at least one timestep of the unlabeled digital video data. In some embodiments, the operations may further comprise adding the at least one pseudo-label to the unlabeled digital video data. In some embodiments, the operations may also comprise further training the IDM or a machine learning model using the pseudo-labeled digital video data.

Other systems, methods, and computer-readable media are also discussed within.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
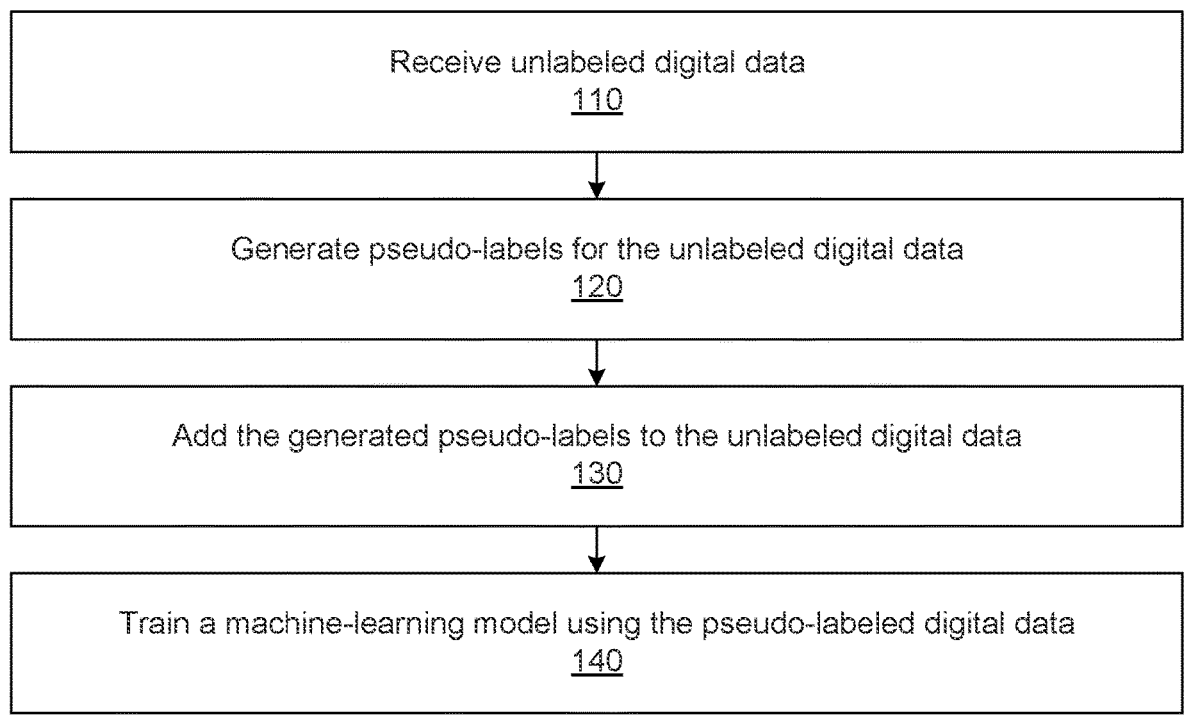
FIG. 1 is a flow diagram illustrating an exemplary method for training a machine learning model to perform automated actions according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities.

For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

The present disclosure enables the extension of internet-scale pretraining to sequential decision domains via the use of semi-supervised imitation learning wherein models learn to act by utilizing publicly available unlabeled data. By providing a model with a small amount of labeled data as training data, the model can be trained to accurately label a much larger set of unlabeled data, which can then be used as further training data for the model (or another model) to learn to act via a human user interface (e.g., an interface designed for human input rather than machine input). Disclosed embodiments enable models to exhibit human-level performance with only a small set of labeled training data because the model is capable of further labelling publicly available data that is not initially labeled. In turn, the newly labeled data may be utilized for further training of the model based on a significantly larger dataset.

Illustrative embodiments of the present disclosure are described below. In one embodiment, as illustrated in FIG. 1, a method 100 for training a machine learning model to perform automated actions is depicted. The process shown in FIG. 1 or any of its constituent steps may be implemented using operating environment 300, operating environment 400, or any component thereof. The steps illustrated in FIG. 1 are exemplary and steps may be added, merged, divided, duplicated, repeated (e.g., as part of a machine learning process), modified, performed sequentially, performed in parallel, and/or deleted in some embodiments.

Method 100 may include a step 110 of receiving unlabeled digital data. In some embodiments, the received unlabeled digital data may be public (e.g., publicly available, such as internet-accessible) data. In other embodiments, the received unlabeled digital data may be private data or a combination of public and private data. Public data, as used herein, may refer to any publicly available data, such as video data, image data, audio data, text data, unstructured data, big data, binary data, or any other data that is generally available to the public. Private data, as used herein, may refer to any video data, image data, audio data, text data, unstructured data, big data, binary data, or any other data that is available to a select group of devices, systems, networks, recipients, individuals, and/or organizations. In some embodiments, the unlabeled digital data may include one or more of video data, audio data, pre-recorded data, streaming data, live data, as well as other types of data. In some embodiments, the unlabeled digital data may be gathered by searching for keywords related to the type of data desired (e.g., online video data for a particular application or program). In some embodiments, the unlabeled digital data may be cleaned (e.g., filtered by a machine learning model trained on data comprising image samples labeled as clean or unclean) to provide a clean set of unlabeled data. For example, a clean set of unlabeled digital data may include data without any visual artifacts (e.g., a machine may identify and remove visual artifacts from a frame or stream of digital video data). As another example, a clean set of unlabeled digital data may include data from a particular mode associated with a program or application of interest). Additionally, or alternatively, a clean set of unlabeled digital data may include digital video data with portions trimmed or compressed from a video stream (e.g., removing portions from the video stream unassociated or temporally distant from an action of interest).

In some embodiments, method 100 may include a step 120 of generating pseudo-labels for the unlabeled digital video data. A pseudo-label, as used herein, may refer to a digital marking, metadata, a tag, or other data provided in electronic form that indicates an attribute of digital video data (e.g., one or more digital video frames). In some embodiments, generating pseudo-labels for the unlabeled digital video data may include receiving labeled digital video data, training a machine learning model using the labeled digital video data, and/or generating at least one pseudo-label for the unlabeled digital data, for example as described below with respect to FIG. 2.

In some embodiments, method 100 may include a step 130 of adding the at least one pseudo-label to the unlabeled digital data, thereby converting the unlabeled digital data into pseudo-labeled digital data. In some embodiments, the pseudo-labeled digital data may include video timestep data which is correlated with predicted user action data (e.g., data representative of or indicating a user action, such as the examples described above). For example, the pseudo-labeled data may include annotations (e.g., paired action data or paired action tags), as provided by the pseudo-labels generated by the machine learning model, corresponding to one or more timesteps of the digital video data. As a result, the labeled digital video data may contain timestep data which is paired with predicted user interface action data for one or more given timesteps within the digital video data. In some embodiments, the predicted user action data may be determined by a non-causal machine learning model based on past and/or future information found within the unlabeled digital video data. By utilizing both past and/or future information (e.g., past and/or future digital timestep data) within the unlabeled digital video data, the machine learning model may be configured to make non-causal determinations when inferring or predicting user action data associated with a given timestep. As a result of utilizing both past and future information from a dataset, an accurate machine learning model may be trained more easily and more efficiently while requiring less labeled data. In some embodiments, the trained machine learning model may further be utilized to generate and add pseudo-labels to additional available digital video data which is initially unlabeled. For example, the machine learning model may generate additional pseudo-labels for one or more large sets of unlabeled digital data (e.g., 2,000 to 1 million hours of unlabeled data, or more), which would be impractical, if not impossible, for the human mind.

In some embodiments, method 100 may include a step 140 of further training the machine learning model or another machine learning model using the pseudo-labeled digital video data. In some embodiments, a causal machine learning model may be trained using the pseudo-labeled digital video data (wherein the pseudo-labeled digital video data may be determined and/or provided by a non-causal machine learning model). In some embodiments, the machine learning model may be trained to generate and to perform one or more actions via a user interface associated with a program, application, or website. For example, the machine learning model may be configured (e.g., post-training) to generate and/or perform one or more actions via a user interface without performing a physical action (e.g., mouse click or key press) associated with the user interface action (e.g., by electronically communicating directly with a program or application associated with the user interface). It will be understood that the user interface may be associated with one or more of a variety of programs, applications, or websites, such as video games, processing applications, web browsers, spreadsheet applications, file explorers, or any other program, application, website, or domain having a user interface. In some embodiments, the one or more actions may be user actions such as at least one of a key press, a button press, a touchscreen input, a joystick movement, a mouse click, a scroll wheel movement, or a mouse movement via a human user interface, wherein the actions are generated and performed without human intervention or involvement. It will be understood that the machine learning model may be configured to override the routine and conventional sequence of events ordinarily associated with human user interface activity because no human intervention (e.g., physical clicking of a mouse or press of a key) is required. For example, the machine learning model may be trained and configured to provide consistent and accurate user actions within an unmodified human action space via a human user interface to achieve results which mimic human interaction with the application, program, or website, all without requiring any human intervention. As a result, interactions between the machine learning model and the program, application, website, etc. may be manipulated to automatically yield desired results without human intervention. Such a communicative connection between the machine learning model (e.g., a machine) and a human user interface is non-conventional due to the human-to-machine nature of the human user interface.

In some embodiments, the trained machine learning model may further label additional available digital video data which is initially unlabeled. As a result of such further labeling (e.g., pseudo-labeling), the amount of available labeled data may increase. As such, the training data available to train a causal machine learning model may increase, and in turn, the causal machine learning model may become more accurate and efficient. In some embodiments, a causal machine learning model may be a behavioral cloning (e.g., imitation learning) model. In some embodiments, the causal machine learning model may be a reinforcement learning model. In some embodiments, the causal machine learning model may be one which utilized both behavioral cloning (e.g., imitation learning) and reinforcement learning techniques. In some embodiments, to further improve the accuracy and efficiency of a trained machine learning model, such as to help it maintain learned skills, an auxiliary Kullback-Leibler (KL) divergence loss may be added between a reinforcement learning model and corresponding training data (e.g., a frozen pretrained policy). In some embodiments, the machine learning model may be trained (e.g., after initial training or configuration) on narrower datasets, which may be focused on digital video and/or action data that is associated with more specific actions (e.g., a particular process or outcome in an application or program) than an initial training dataset.

Figure 2:
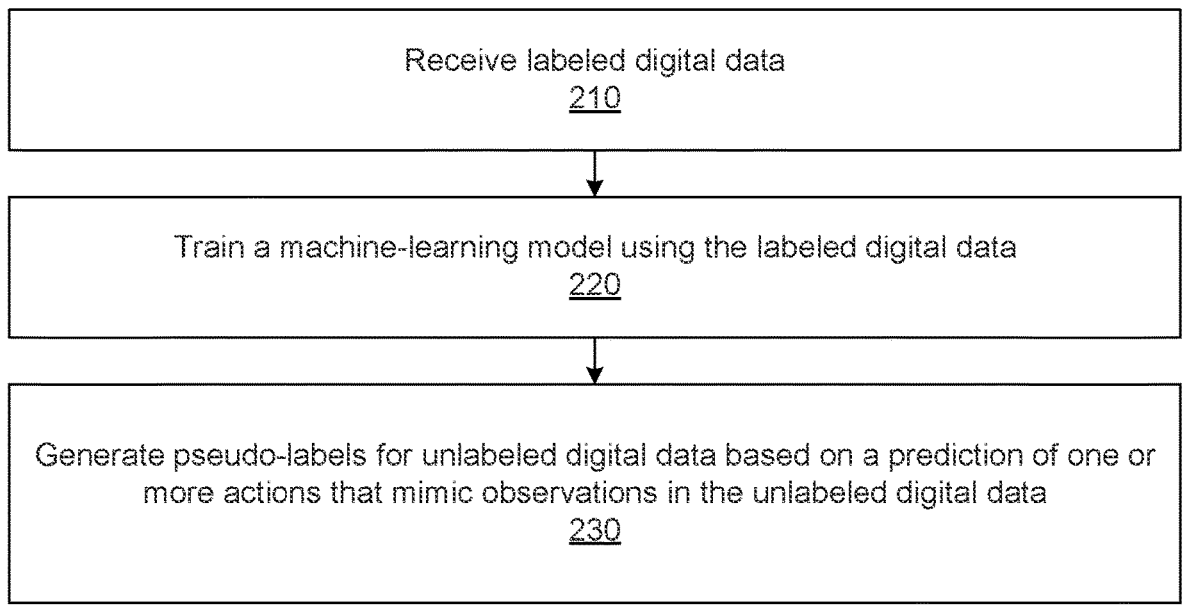
FIG. 2 is a flow diagram illustrating an exemplary method for generating pseudo-labels according to some embodiments of the present disclosure.

As illustrated in FIG. 2, a method 200 for generating pseudo-labels may comprise a step 210 of receiving labeled digital video data (e.g., data containing action-observation pairs). In some embodiments, the received labeled digital video data may include video data (e.g., observation data) which is correlated (e.g., paired) with actual user action data (action data) thus forming action-observation pairs within the digital video data. For example, the labelled digital video data may include annotations, as provided by a human agent, corresponding to one or more timesteps of the digital video data. The annotations may include a reference to one or more user actions performable via a user interface and representative of at least one of a key press, a button press, a touchscreen input, a joystick movement, a mouse click, a scroll wheel movement, or a mouse movement. As a result, the labeled digital video data may contain timestep data which is paired with user action data for a given timestep. As used herein, a timestep may refer to at least one frame of a digital video, wherein the at least one frame corresponds to a change in a displayed environment (e.g., a movement, a selection, an effect, etc.).

In some embodiments, the method 200 of generating pseudo-labels may further comprise a step 220 of training a machine learning model (e.g., an inverse dynamics model (IDM), or any artificial intelligence model, including supervised, semi-supervised, unsupervised, and reinforcement learning models, as well as binary classification, multiclass classification, regression, and neural network-based models) using the labeled digital video data. As an example, an IDM may initially be trained using non-causal data from a small amount of labeled contractor data (e.g., 100 to 2,000 hours of data containing observation-action pairs created by human contractors). Such an IDM (or other type of machine learning model) may be configured to minimize the negative log-likelihood of an action at a particular timestep given a trajectory of observations. One benefit of utilizing an IDM over, e.g., an imitation learning model, is that the IDM can be non-causal, meaning that the IDM's prediction of a user action may be a function of both past and future events from the unlabeled data (e.g., past and future frames relative to a reference frame). Past and/or future information within the unlabeled digital video data, as used herein, may refer to one or more frames or images within the unlabeled digital video data, the one or more frames or images being relative to (e.g., prior to or forward of) a reference frame within the unlabeled digital video data. Examples of machine learning models and training are also described with respect to FIG. 5.

In some embodiments, the method 200 of generating pseudo-labels may further comprise a step 230 of generating at least one pseudo-label for the unlabeled digital data ((e.g., data which does not initially contain action-observation pairs). In some embodiments, the at least one pseudo-label may be generated based on a prediction made by the machine learning model of one or more actions which may be implemented via a user interface (e.g., a native human user interface) to mimic at least one timestep of the unlabeled digital data. As an example, a non-causal IDM may be utilized to generate pseudo-labels.

Figure 3:
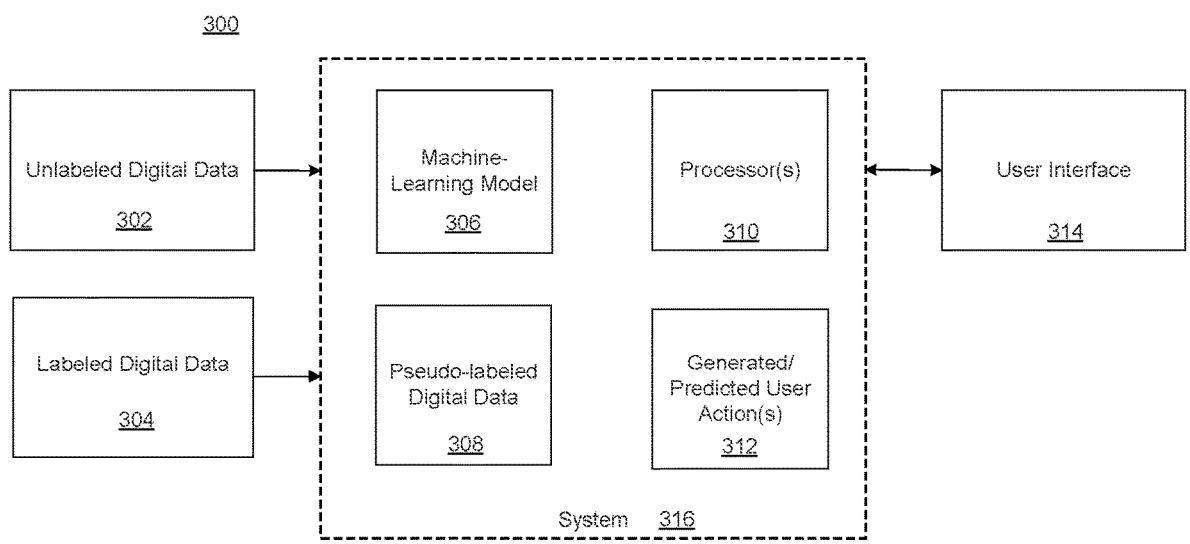
FIG. 3 is a functional block diagram of an exemplary operating environment for training a machine learning model to perform automated actions according to some embodiments of the present disclosure.

FIG. 3 is a functional block diagram that describes an exemplary operating environment 300 for implementing the methods of FIGS. 1 and 2, according to some embodiments of the present disclosure. In some embodiments, the operating environment 300 may include a system 316 comprising at least one memory storing instructions (not shown), at least one processor 310 configured to execute the instructions to perform a set of operations for training a machine learning model to label unlabeled data and/or to perform automated actions. System 316 may be an instance of and/or include features of system 500. The set of operations may mirror the steps of the methods 100 and 200 described herein. As such, the system 316 may be configured for receiving unlabeled digital video data 302. The system may further be configured for generating pseudo-labels for the unlabeled digital video data, thereby generating pseudo-labeled digital video data 308. In some embodiments, the generating of pseudo-labels may comprise receiving labeled digital video data 304, training a machine learning model 306, such as, e.g., an inverse dynamics model (IDM), using the labeled digital video data 304, and/or generating at least one pseudo-label for the unlabeled digital video data 302. In some embodiments, the at least one pseudo-label may be generated based on a prediction by the IDM of one or more user actions 312 that may be implemented at a user interface 314 to mimic at least one timestep of the unlabeled digital video data 302. The system 316 may further be configured for adding the at least one pseudo-label to the unlabeled digital video data 302, thereby generating pseudo-labeled digital data 308. In some embodiments, the system 316 may also be configured for further training a machine learning model 306 using the pseudo-labeled digital video data 308. The machine learning model 306 may be further trained to label additional unlabeled digital data received or to provide additional generated user actions 312 to be performed at a user interface 314.

According to another embodiment of the present disclosure, a non-transitory computer readable medium comprising instructions to perform steps for training a machine learning model to perform automated actions may be provided. The steps embodied in the instructions of the non-transitory computer readable medium may mirror the steps of the method 100 described herein. As such, the steps may be configured for receiving unlabeled digital video data. The steps may further be configured for generating pseudo-labels for the unlabeled digital video data, the generating comprising receiving labeled digital video data, training an inverse dynamics model (IDM) using the labeled digital video data, and/or generating at least one pseudo-label for the unlabeled digital video data. In some embodiments, the at least one pseudo-label may be generated based on a prediction by the IDM of one or more actions required to mimic at least one timestep of the unlabeled digital video data. The steps may further be configured for adding the at least one pseudo-label to the unlabeled digital video data. In some embodiments, the steps may also be configured for further training the IDM or a machine learning model using the pseudo-labeled digital video data.

Figure 4:
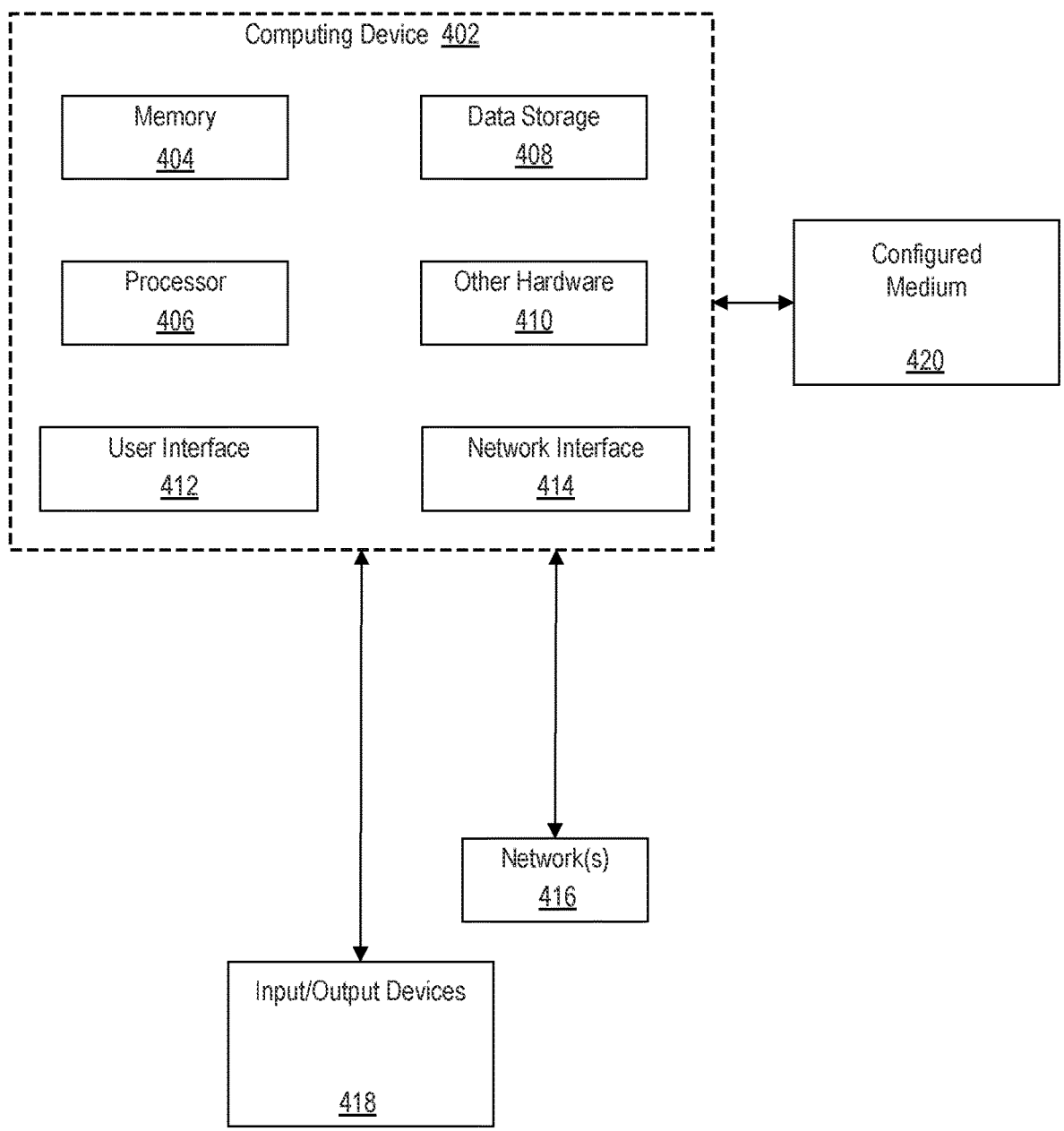
FIG. 4 is a block diagram illustrating an exemplary operating environment for implementing various aspects of this disclosure, according to some embodiments of the present disclosure.

An exemplary operating environment for implementing various aspects of this disclosure is illustrated in FIG. 4. As illustrated in FIG. 4, an exemplary operating environment 400 may include a computing device 402 (e.g., a general-purpose computing device) in the form of a computer. In some embodiments, computing device 402 may be associated with a user. Components of the computing device 402 may include, but are not limited to, various hardware components, such as one or more processors 406, data storage 408, a system memory 404, other hardware 410, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 4, an operating environment 400 for an exemplary embodiment includes at least one computing device 402. The computing device 402 may be a uniprocessor or multiprocessor computing device. An operating environment 400 may include one or more computing devices (e.g., multiple computing devices 402) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 402 may be configured for end-users, e.g., with applications, for administrators, as a server, as a distributed processing node, as a special-purpose processing device, or otherwise configured to train machine learning models and/or use machine learning models. In some embodiments, multiple computing devices 402 (e.g., a network of GPUs) may be configured to train a machine learning model.

One or more users may interact with the computer system comprising one or more computing devices 402 by using a display, keyboard, mouse, microphone, touchpad, camera, sensor (e.g., touch sensor) and other input/output devices 418, via typed text, touch, voice, movement, computer vision, gestures, and/or other forms of input/output. An input/output device 418 may be removable (e.g., a connectable mouse or keyboard) or may be an integral part of the computing device 402 (e.g., a touchscreen, a built-in microphone). A user interface 412 may support interaction between an embodiment and one or more users. A user interface 412 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touchscreen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 418 and computing device 402, based on input received from at user interface 412 and/or from network(s) 416. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 402 in other embodiments, depending on their detachability from the processor(s) 406. Other computerized devices and/or systems not shown in FIG. 4 may interact in technological ways with computing device 402 or with another system using one or more connections to a network 416 via a network interface 414, which may include network interface equipment, such as a physical network interface controller (NIC) or a virtual network interface (VIF).

Computing device 402 includes at least one logical processor 406. The at least one logical processor 406 may include circuitry and transistors configured to execute instructions from memory (e.g., memory 404). For example, the at least one logical processor 406 may include one or more central processing units (CPUs), arithmetic logic units (ALUs), Floating Point Units (FPUs), and/or Graphics Processing Units (GPUs). The computing device 402, like other suitable devices, also includes one or more computer-readable storage media, which may include, but are not limited to, memory 404 and data storage 408. In some embodiments, memory 404 and data storage 408 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 420 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 402, making its content accessible for interaction with and use by processor(s) 406. The removable configured medium 420 is an example of a computer-readable storage medium. Some other examples of computer-readable storage media include built-in random access memory (RAM), read-only memory (ROM), hard disks, and other memory storage devices which are not readily removable by users (e.g., memory 404).

The configured medium 420 may be configured with instructions (e.g., binary instructions) that are executable by a processor 406; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 420 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 410 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 406, memory 404, data storage 408, and screens/displays, an operating environment 400 may also include other hardware 410, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 418 such as human user input/output devices (screen, keyboard, mouse, tablet, microphone, speaker, motion sensor, etc.) will be present in operable communication with one or more processors 406 and memory.

In some embodiments, the system includes multiple computing devices 402 connected by network(s) 416. Networking interface equipment can provide access to network(s) 416, using components (which may be part of a network interface 414) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 402 may operate in a networked or cloud-computing environment using logical connections to one or more remote devices (e.g., using network(s) 416), such as a remote computer (e.g., another computing device 402). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 402 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 402 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 408 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 408 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for training a machine learning model to label unlabeled data and/or to perform automated actions. For example, in some embodiments, and as illustrated in FIG. 4, an operating environment 400 may include at least one computing device 402, the at least one computing device 402 including at least one processor 406, at least one memory 404, at least one data storage 408, and/or any other component discussed above with respect to FIG. 4.

Figure 5:
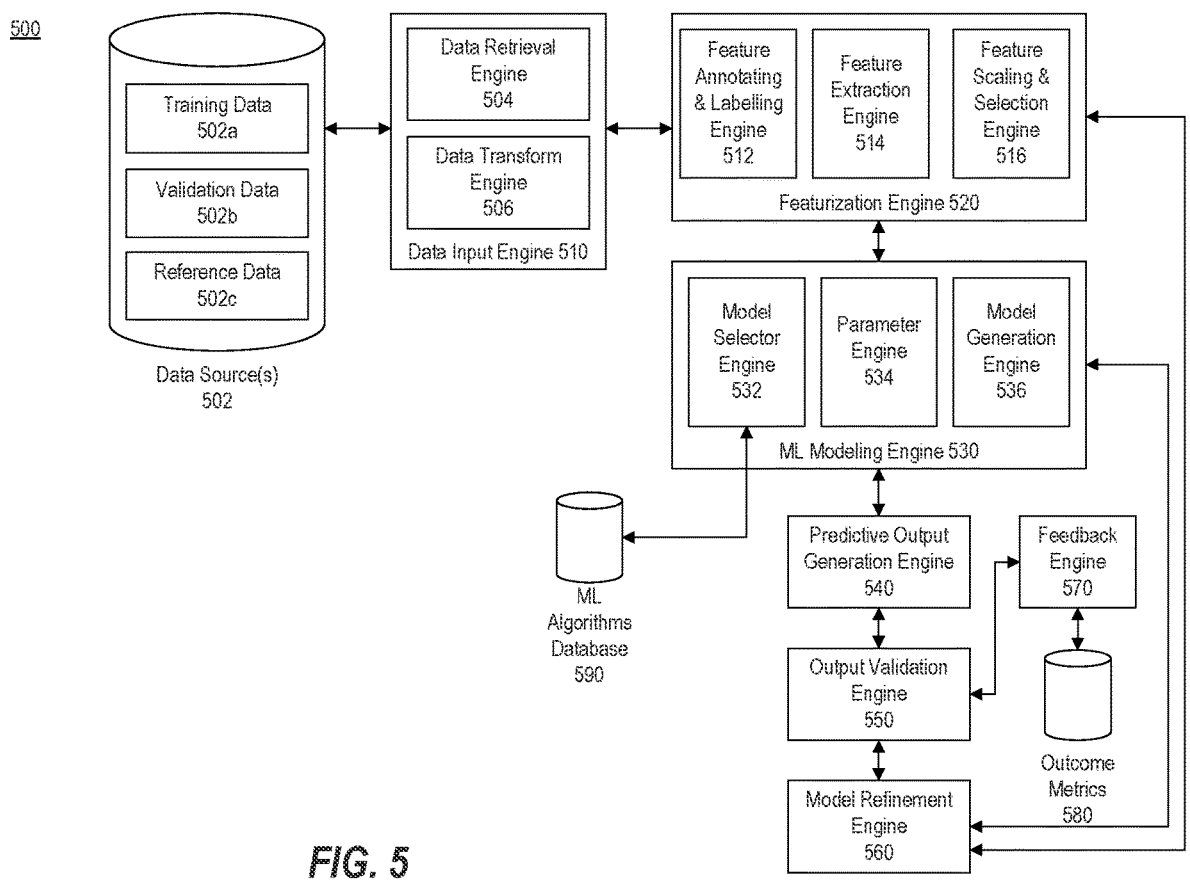
FIG. 5 is a block diagram illustrating an exemplary machine learning platform for implementing various aspects of this disclosure, according to some embodiments of the present disclosure.

FIG. 5 is a block diagram illustrating an exemplary machine learning platform for implementing various aspects of this disclosure, according to some embodiments of the present disclosure.

System 500 may include data input engine 510 that can further include data retrieval engine 504 and data transform engine 506. Data retrieval engine 504 may be configured to access, access, interpret, request, or receive data, which may be adjusted, reformatted, or changed (e.g., to be interpretable by other engine, such as data input engine 510). For example, data retrieval engine 504 may request data from a remote source using an API. Data input engine 510 may be configured to access, interpret, request, format, re-format, or receive input data from data source(s) 502. For example, data input engine 510 may be configured to use data transform engine 506 to execute a re-configuration or other change to data, such as a data dimension reduction. Data source(s) 502 may exist at one or more memories 404 and/or data storages 408. In some embodiments, data source(s) 502 may be associated with a single entity (e.g., organization) or with multiple entities. Data source(s) 502 may include one or more of training data 502a (e.g., input data to feed a machine learning model as part of one or more training processes), validation data 502b (e.g., data against which at least one processor may compare model output with, such as to determine model output quality), and/or reference data 502c. In some embodiments, data input engine 510 can be implemented using at least one computing device (e.g., computing device 402). For example, data from data sources 502 can be obtained through one or more I/O devices and/or network interfaces. Further, the data may be stored (e.g., during execution of one or more operations) in a suitable storage or system memory. Data input engine 510 may also be configured to interact with data storage 408, which may be implemented on a computing device that stores data in storage or system memory. System 500 may include featurization engine 520. Featurization engine 520 may include feature annotating & labeling engine 512 (e.g., configured to annotate or label features from a model or data, which may be extracted by feature extraction engine 514), feature extraction engine 514 (e.g., configured to extract one or more features from a model or data), and/or feature scaling and selection engine 516. Feature scaling and selection engine 516 may be configured to determine, select, limit, constrain, concatenate, or define features (e.g., AI features) for use with AI models. System 500 may also include machine learning (ML) modeling engine 530, which may be configured to execute one or more operations on a machine learning model (e.g., model training, model re-configuration, model validation, model testing), such as those described in the processes described herein. For example ML modeling engine 530 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 502a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 530 may include model selector engine 532 (e.g., configured to select a model from among a plurality of models, such as based on input data), parameter selector engine 534 (e.g., configured to add, remove, and/or change one or more parameters of a model), and/or model generation engine 536 (e.g., configured to generate one or more machine learning models, such as according to model input data, model output data, comparison data, and/or validation data). Similar to data input engine 510, featurization engine 520 can be implemented on a computing device. In some embodiments, model selector engine 532 may be configured to receive input and/or transmit output to ML algorithms database 590 (e.g., a data storage 408). Similarly, featurization engine 520 can utilize storage or system memory for storing data and can utilize one or more I/O devices or network interfaces for transmitting or receiving data. ML algorithms database 590 (or other data storage 408) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a Generative Pre-trained Transformer (GPT) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 500 can further include predictive output generation engine 540, output validation engine 550 (e.g., configured to apply validation data to machine learning model output), feedback engine 570 (e.g., configured to apply feedback from a user and/or machine to a model), and model refinement engine 560 (e.g., configured to update or reconfigure a model). In some embodiments, feedback engine 570 may receive input and/or transmit output (e.g., output from a trained, partially trained, or untrained model) to outcome metrics database 580. Outcome metrics database 580 may be configured to store output from one or more models, and may also be configured to associate output with one or more models. In some embodiments, outcome metrics database 580, or other device (e.g., model refinement engine 560 or feedback engine 570) may be configured to correlate output, detect trends in output data, and/or infer a change to input or model parameters to cause a particular model output or type of model output. In some embodiments, model refinement engine 560 may receive output from predictive output generation engine 540 or output validation engine 550. In some embodiments, model refinement engine 560 may transmit the received output to featurization engine 520 or ML modeling engine 530 in one or more iterative cycles.

Any or each engine of system 500 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 500 may be split across multiple computing devices to allow for distributed processing of the data, which may improve output speed and reduce computational load on individual devices. In some embodiments, system 500 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 500 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method comprising:
receiving unlabeled digital video data;
generating, via a machine learning model, pseudo-labels for the unlabeled digital video data, the generating comprising:
predicting one or more interface actions that achieve at least one timestep of the unlabeled digital video data;
the predicting being based on a non-causal combination of past information and future information within the unlabeled digital video data, the past information and the future information being relative to one or more reference frames within the unlabeled digital video data; and
adding the pseudo-labels to the unlabeled digital video data to form pseudo-labeled digital video data.

2. The method of claim 1, wherein the machine learning model is trained to perform the one or more predicted interface actions via a user interface without human intervention.

3. The method of claim 1, wherein the one or more predicted interface actions include at least one of a key press, a button press, a touchscreen input, a joystick movement, a mouse click, a scroll wheel movement, or a mouse movement.

4. The method of claim 1, wherein the received unlabeled digital video data is public data.

5. The method of claim 1, wherein the predicting is further based on video data correlated with actual user action data.

6. The method of claim 1, wherein the pseudo-labeled digital video data includes video data correlated with predicted user action data.

7. The method of claim 1, further comprising training the machine learning model using the pseudo-labeled digital video data to generate at least one additional pseudo-label for the unlabeled digital video data.

8. The method of claim 1, wherein the machine learning model includes an inverse dynamics model (IDM).

9. The method of claim 1, further comprising training a causal machine learning model using the pseudo-labeled digital video data.

10. The method of claim 9, wherein the causal machine learning model is at least one of a behavioral cloning model or a reinforcement learning model.

11. The method of claim 1, wherein the non-causal combination of past information and future information includes at least a first frame, a second frame, and a third frame of the unlabeled digital video data.

12. The method of claim 1, wherein the non-causal combination of past information and future information includes at least a first frame and a second frame, wherein the first frame and the second frame are associated and non-causal frames.

13. A system comprising:
at least one memory storing instructions;
at least one processor configured to execute the instructions to perform operations, the operations comprising:
receiving unlabeled digital video data;
generating, via a machine learning model, pseudo-labels for the unlabeled digital video data, the generating comprising:
predicting one or more interface actions that achieve at least one timestep of the unlabeled digital video data;
the predicting being based on a non-causal combination of past information and future information within the unlabeled digital video data, the past information and the future information being relative to one or more reference frames within the unlabeled digital video data; and
adding the pseudo-labels to the unlabeled digital video data to form pseudo-labeled digital video data.

14. The system of claim 13, wherein the machine learning model is trained to perform the one or more predicted interface actions via a user interface without human intervention.

15. The system of claim 13, wherein the one or more predicted interface actions include at least one of a key press, a button press, a touchscreen input, a joystick movement, a mouse click, a scroll wheel movement, or a mouse movement.

16. The system of claim 13, wherein the received unlabeled digital video data is public data.

17. The system of claim 13, wherein the predicting is further based on video data correlated with actual user action data.

18. The system of claim 13, wherein the pseudo-labeled digital video data includes video data correlated with predicted user action data.

19. The system of claim 13, the operations further comprising training the machine learning model using the pseudo-labeled digital video data to generate at least one additional pseudo-label for the unlabeled digital video data.

20. The system of claim 13, wherein the machine learning model includes an inverse dynamics model (IDM).

21. The system of claim 13, the operations further comprising training a causal machine learning model using the pseudo-labeled digital video data.

22. A non-transitory computer-readable medium including instructions that are executable by one or more processors to perform operations comprising:
receiving unlabeled digital video data;
generating, via a machine learning model, pseudo-labels for the unlabeled digital video data, the generating comprising:
predicting one or more interface actions that achieve at least one timestep of the unlabeled digital video data;
the predicting being based on a non-causal combination of past information and future information within the unlabeled digital video data, the past information and the future information being relative to one or more reference frames within the unlabeled digital video data; and
adding the pseudo-labels to the unlabeled digital video data to form pseudo-labeled digital video data.

* * * * *